United States Patent
Kim et al.

(10) Patent No.: US 9,207,474 B2
(45) Date of Patent: Dec. 8, 2015

(54) DISPLAY APPARATUS

(75) Inventors: Man-Soo Kim, Seongnam-si (KR);
Tae-Gil Kang, Hwaseong-si (KR)

(73) Assignee: SAMSUNG DISPLAY CO., LTD.,
Yongin, Gyeonggi-Do (KR)

( * ) Notice: Subject to any disclaimer, the term of this patent is extended or adjusted under 35 U.S.C. 154(b) by 591 days.

(21) Appl. No.: 13/326,417

(22) Filed: Dec. 15, 2011

(65) Prior Publication Data

US 2012/0230051 A1 Sep. 13, 2012

(30) Foreign Application Priority Data

Mar. 9, 2011 (KR) .................. 10-2011-0020840

(51) Int. Cl.
*G02F 1/1333* (2006.01)

(52) U.S. Cl.
CPC .............. *G02F 1/133308* (2013.01); *G02F 2001/133314* (2013.01)

(58) Field of Classification Search
CPC ........ G02F 2001/133314; G02F 2001/133317; G02F 1/133608
USPC ...................................... 349/58–59
See application file for complete search history.

(56) References Cited

U.S. PATENT DOCUMENTS

| 2002/0034064 A1* | 3/2002 | Kim | 361/681 |
|---|---|---|---|
| 2008/0018848 A1* | 1/2008 | Iwato et al. | 349/149 |
| 2008/0174730 A1* | 7/2008 | Lee et al. | 349/149 |
| 2008/0239757 A1* | 10/2008 | Cha et al. | 362/633 |
| 2009/0237590 A1* | 9/2009 | Kwon et al. | 349/58 |
| 2010/0066939 A1 | 3/2010 | Ohashi et al. | |
| 2010/0073587 A1* | 3/2010 | Satoh | 349/40 |
| 2010/0277664 A1* | 11/2010 | Kim et al. | 349/58 |
| 2013/0027648 A1* | 1/2013 | Moriwaki | 349/138 |
| 2015/0116607 A1* | 4/2015 | Cheng et al. | 349/12 |

FOREIGN PATENT DOCUMENTS

| CN | 001303021 | 7/2001 |
|---|---|---|
| CN | 001321910 | 11/2001 |
| CN | 001459651 | 12/2003 |
| CN | 101876765 | 11/2010 |
| KR | 10-2006-0062177 | 6/2006 |
| KR | 10-2008-0075573 | 8/2008 |
| KR | 10-2010-0054663 | 5/2010 |

OTHER PUBLICATIONS

English Abstract for Publication No. 10-2006-0062177.
English Abstract for Publication No. 10-2008-0075573.
English Abstract for Publication No. 10-2010-0054663.

* cited by examiner

*Primary Examiner* — Eric Wong
(74) *Attorney, Agent, or Firm* — F. Chau & Associates, LLC

(57) ABSTRACT

A lower case for a display apparatus includes a receiving part and a sidewall part. The receiving part has a planar bottom plate extending in a first direction and a side portion substantially perpendicular to and extending from the bottom plate in a second direction normal to the bottom plate. The sidewall part is disposed along an edge of the bottom plate that forms a first receiving space with the bottom plate for receiving a backlight assembly having a light source assembly. The sidewall part further includes a first sidewall not adjacent to the light source unit, a second sidewall adjacent to the light source unit, and a third receiving space surrounding the first receiving space for receiving a wire.

19 Claims, 4 Drawing Sheets

DISPLAY APPARATUS

PRIORITY STATEMENT

This application claims priority under 35 U.S.C. §119 from Korean Patent Application No. 2011-20840, filed on Mar. 9, 2011 in the Korean Intellectual Property Office (KIPO), the contents of which are herein incorporated by reference in their entirety.

BACKGROUND

1. Technical Field

Exemplary embodiments of the present disclosure are directed to a display apparatus. More particularly, exemplary embodiments of the present disclosure are directed to a display apparatus used for a laptop computer.

2. Description of the Related Art

In general, a display apparatus such as that included with a laptop computer includes a display module and a lower case covering the display module. The display module includes a display panel, a backlight assembly, and a chassis that receives the display panel and the backlight assembly. The chassis may be a top chassis, a middle chassis, or a bottom chassis.

After the chassis receives the display panel and the backlight assembly, the chassis is combined with the display panel or backlight assembly by either a side surface combining method or a top combining method. In a side surface combining method, side surfaces of the chassis are horizontally combined with the display panel or backlight assembly by a screw, etc. In a top combining method, top surfaces of the chassis are vertically combined with the display panel or backlight assembly by a screw, etc.

The chassis is used to guide and receive the display panel and a light controlling member and a light guide plate of the backlight assembly.

However, the chassis type, i.e., whether the chassis is a top chassis, a middle chassis, or a bottom chassis, may effect decreasing the size or weight of the display apparatus.

SUMMARY

Exemplary embodiments of the present disclosure provide a display apparatus with a simplified receiving structure and decreased weight.

According to an exemplary embodiment of the present disclosure, the display apparatus includes a display panel, a backlight assembly and a lower case. The display panel can display an image. The backlight assembly is disposed under the display panel and includes a light source unit along a side thereof. According to an embodiment, the light source unit is along one side of the backlight assembly. Alternatively, the light source unit may be along more than one side of the backlight assembly. The lower case has a first receiving space and a third receiving space. The first receiving space contains the backlight assembly. The third receiving space surrounds the first receiving space and contains a wire.

In the exemplary embodiment, the lower case may include a receiving part and a sidewall part. The receiving part may have a planar bottom plate extending in a first direction and a side portion substantially perpendicular to and extending from the bottom plate in a second direction normal to the bottom plate. The sidewall part may be disposed along an edge of the bottom plate and forms the first receiving space with the bottom plate. The sidewall part includes a first sidewall not adjacent to the light source unit and a second sidewall adjacent to the light source unit.

In the exemplary embodiment, the first sidewall may include a first side surface, a first top surface, a second side surface and a second top surface. The first side surface may extend from the bottom plate in the second direction. The first top surface may extend from the first side surface in the first direction and may support the display panel. The second side surface may extend from the first top surface in the second direction to form a second receiving space for receiving the display panel and for preventing the display panel from moving horizontally moving. The second top surface may extend from the second side surface in the first direction.

In the exemplary embodiment, the first sidewall may include a third side surface, a first bottom surface and a fourth side surface. The third side surface may extend from the second top surface in an opposite second direction. The first bottom surface may extend from the third side surface in the first direction. The fourth side surface may extend from the first bottom surface in the second direction and face the third side surface. The third side surface, the first bottom surface and the fourth side surface may form the third receiving space.

In the exemplary embodiment, the first sidewall may include a third top surface, a fifth side surface, a second bottom surface, and a sixth side surface. The third top surface may extend from the fourth side surface in the first direction. The fifth side surface may extend from the third top surface in the opposite second direction. The second bottom surface may extend from the fifth side surface in the first direction. The sixth side surface may extend from the second bottom surface in the second direction.

In the exemplary embodiment, the display apparatus may further include a protecting member disposed on the sidewall part and the display panel and an elastic member disposed between the sidewall part and the protecting member. The fifth side surface, the second bottom surface, and the sixth side surface from a groove for receiving the elastic member that supports the protecting member and prevents the protecting member from moving horizontally.

In the exemplary embodiment, the second sidewall includes an eighth side surface, a third lower surface, and a ninth side surface. The eighth side surface may extend from the bottom plate in the second direction. The third lower surface may extend from the eighth side surface in the first direction. The ninth side surface may extend from the third lower surface in the second direction. The bottom plate, the eighth side surface, and the third lower surface form an indented space for receiving the light source unit, and the first side surface, the eight side surface and the ninth side surface form the first receiving space for receiving the backlight unit.

In the exemplary embodiment, the first sidewall comprises a first sidewall portion and a second sidewall portion spaced apart from the first sidewall portion in the first direction, and the second sidewall comprises third sidewall portion and a fourth sidewall portion spaced apart from the third sidewall portion in the opposite first direction. The first and third side wall portions may be disposed along the periphery of the bottom plate closer to a center of the bottom plate than the second and fourth side wall portions. The first and third side wall portions form the first receiving space. The space between the first and second sidewall portions and between the third and fourth sidewall portions forms the third receiving space.

In the exemplary embodiment, the first sidewall portion comprises a first side surface, a first top surface, and a second side surface. The first side surface may extend from the bottom plate in the second direction. The first top surface may extend from the first side surface in the first direction. The second side surface may extend from the first top surface in the opposite second direction. The second side wall portion comprises a third side surface, a second top surface, a fourth side surface, and a bottom surface. The third side surface may extend from the bottom plate in the second direction. The second top surface may extend from the third side surface in the first direction. The fourth side surface may extend from the second top surface in the opposite second direction. The bottom surface may extend from the fourth side surface in the first direction. The first top surface further includes a first portion, a second portion, and a third portion. The first portion may connect to the first side surface, the second portion may extend from the first portion in the second direction, and the third portion may extend from the second portion in the first direction and connected to the second side surface. The first to third portions may form a stepped portion.

In the exemplary embodiment, the display apparatus may further include an elastic member disposed on the first to third portions of the first top surface, the second top surface and the bottom surface. The elastic member may cover the third receiving area, may partially overlap with the first portion of the first top surface and may form a second receiving area for receiving the display panel and preventing the display panel from moving horizontally.

In the exemplary embodiment, the elastic member may include a support portion, a guide portion, and first and second protrusions. The support portion may extend in the first direction and may be disposed on the first and second top surfaces. The guide portion may extend from a top surface of the support portion in the second direction adjacent to the protecting member. The first and second protrusions may extend in the opposite second direction from a bottom surface of the support portion at opposite ends of the support portion. The first protrusion may be disposed on the bottom surface and the second protrusion may be disposed on the first portion of the first top surface.

According to another exemplary embodiment, a lower case for a display apparatus may include a receiving part and a sidewall part. The receiving part may have a planar bottom plate extending in a first direction and a side portion substantially perpendicular to and extending from the bottom plate in a second direction normal to the bottom plate. The sidewall part may be disposed along an edge of the bottom plate that forms a first receiving space with the bottom plate for receiving a backlight assembly having a light source assembly. The sidewall part may further include a first sidewall not adjacent to the light source unit, a second sidewall adjacent to the light source unit, and a third receiving space surrounding the first receiving space for receiving a wire.

In the exemplary embodiment, the first sidewall may include a first sidewall portion preventing the backlight assembly from horizontally moving and supporting the display panel, and a second sidewall portion spaced apart from the first sidewall in the first direction and forming the second receiving space with the first sidewall and the bottom plate of the receiving part.

In the exemplary embodiment, the first sidewall portion may include a first side surface, a first top surface, and a second side surface. The first side surface may extend in the second direction to form the first receiving space with the bottom plate, and to prevent the backlight assembly from moving horizontally. The first top surface may extend from the first side surface in the first direction and may support the display panel. The second side surface may connect to the first top surface and may be substantially parallel with the first side surface.

In the exemplary embodiment, the first top surface may further include a first portion, and second portion, and a third portion. The first portion may connect to the first side surface, the second portion may extend from the first portion in the second direction, and the third portion may extend from the second portion in the first direction and may connect to the second side surface. The first to third portions may form a stepped portion.

In the exemplary embodiment, the lower case may further include an elastic member. The eclectic may be disposed on the first to third portions of the first top surface, the second top surface and the bottom surface. The elastic member may cover the third receiving area, may partially overlap with the first portion of the first top surface and may form a second receiving area for receiving a display panel and for preventing the display panel from moving horizontally.

In the exemplary embodiment, the second sidewall portion may include a third side surface and a second top surface. The third side surface may face the second side surface of the first sidewall. The second top surface may extend from the third side surface in the first direction. The second and third side surfaces may form the third receiving space with the bottom plate of the receiving part.

According to a display apparatus of the present disclosure, at least one of a lower case and an elastic member, instead of a chassis, forms receiving spaces receiving a backlight assembly and a display panel of the display apparatus, so that the chassis may be eliminated. Thus, a manufacturing cost, and a weight and thickness of the display apparatus may be decreased.

In addition, a display apparatus includes an elastic member disposed between a corner or an edge of a protecting member and a lower case, to prevent the corner or the edge of the protecting member from being damaged.

In addition, a display apparatus includes an elastic member guiding a side surface of the display panel, to prevent the side surface of the display panel from being damaged.

DETAILED DESCRIPTION OF EXEMPLARY EMBODIMENTS

Hereinafter, exemplary embodiments of the present disclosure will be explained in detail with reference to the accompanying drawings.

Figure 1:
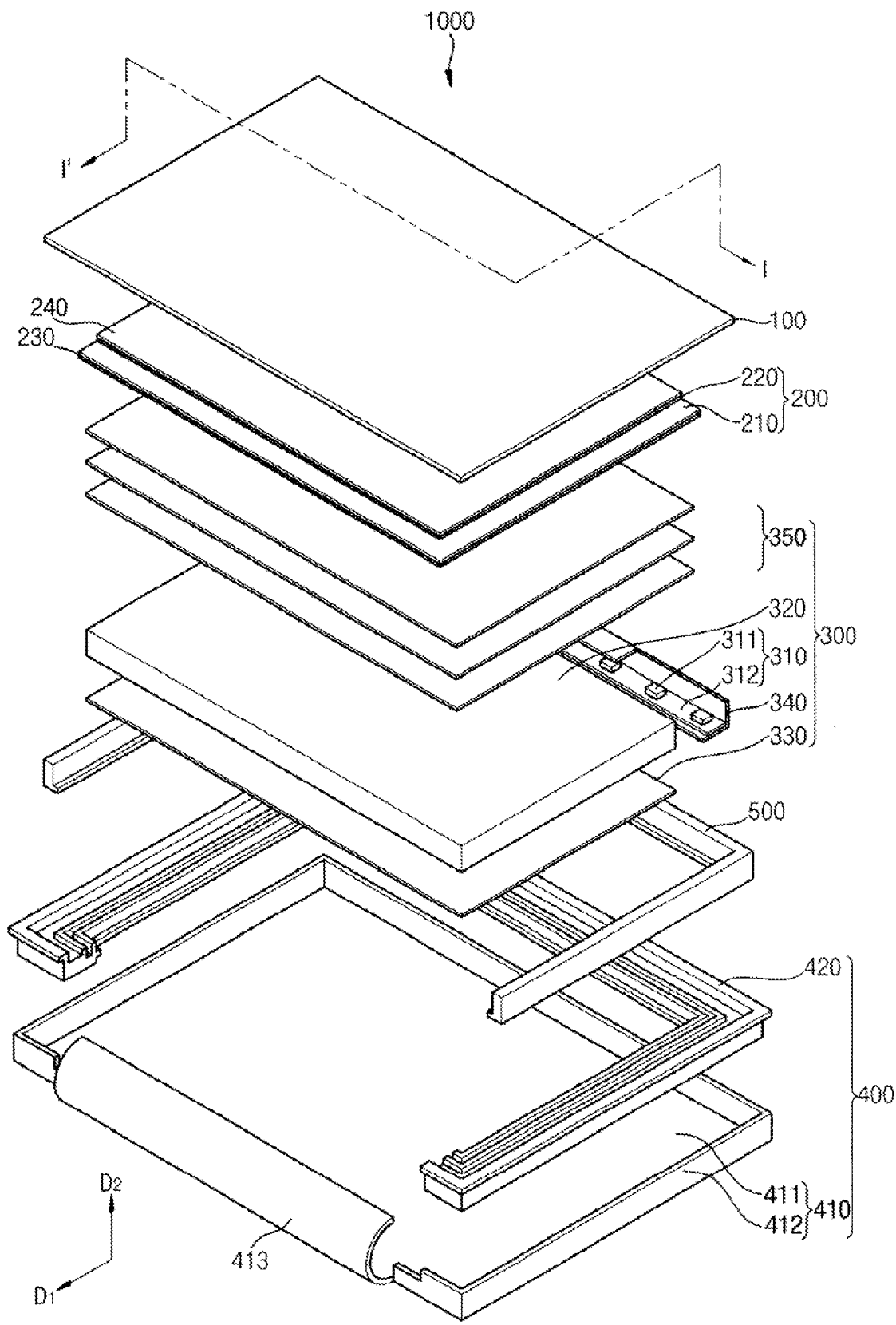
FIG. 1 is an exploded perspective view illustrating a display apparatus according to an exemplary embodiment of the present disclosure.
Figure 2:
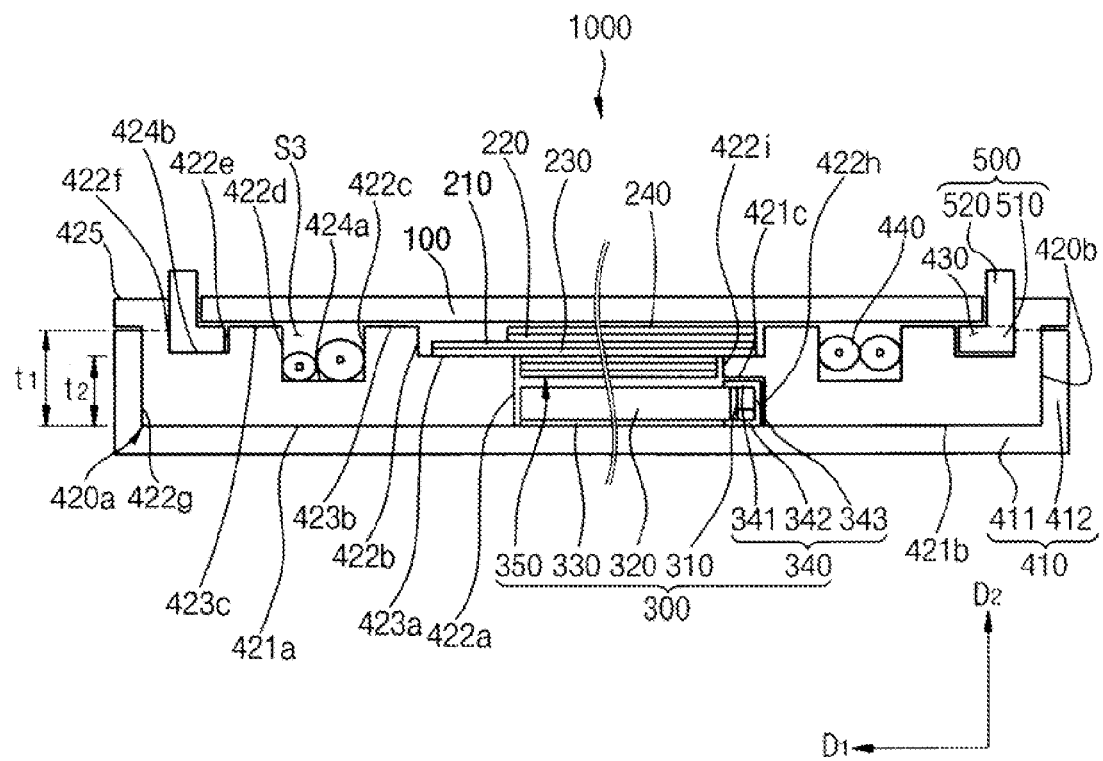
FIG. 2 is a cross-sectional view taken along a line I-I' of FIG. 1.

FIG. 1 is an exploded perspective view illustrating a display apparatus according to an exemplary embodiment of the present disclosure. FIG. 2 is a cross-sectional view taken along a line I-I' of FIG. 1.

Referring to FIGS. 1 and 2, a display apparatus 1000 includes a protecting member 100, a display panel 200, a backlight assembly 300, a lower case 400 and an elastic member 500.

The protecting member 100 is disposed over the display panel 200 and prevents the display panel 200 and the backlight assembly 300 received in the lower case 400 from separating from the lower case 400. In addition, the protecting member 100 protects the display panel 200 against an external impact. For example, the protecting member 100 may include a tempered glass having a thickness of about 0.83 mm. Thus, the protect member 100 can serve as a window directly transmitting an image displayed on the display panel 200.

The display panel 200 includes an array substrate 210 on which switching elements are arranged, an opposite substrate 220 opposite to the array substrate 210, and a liquid crystal layer disposed between the array substrate 210 and the opposite substrate 220. An arrangement of liquid crystals of the liquid crystal layer changes due a voltage applied to the array substrate 210 and the opposite substrate 220, and thus the display panel 200 displays the image.

The display apparatus 1000 may further include a lower polarizer 230 disposed under the array substrate 210 and an upper polarizer 240 disposed above the opposite substrate 220. For example, the upper polarizer 240 may be an anti-glare polarizer. In addition, the upper polarizer 240 may be disposed between the protecting member 100 and the opposite substrate 220 to prevent the protecting member 100 and the opposite substrate 220 from making contact with each other. As a result, the upper polarizer 240 may prevent the occurrence of Newton's ring on the opposite substrate.

The backlight assembly 300 is disposed under the display panel 200 and provides light to the display panel 200. The backlight assembly 300 includes a light guide plate 320, a light source unit 310 along one side of the light guide plate 32, a reflecting sheet 330, a light reflector 340 and a light controlling member 350. The light source unit 310 includes a light source 311 and a printed circuit board 312. The light source 311 may include one or more light-emitting diodes. The light guide plate 320 guides the light emitted from the light source 310 toward the display panel 200. The reflecting sheet 330 is disposed under the light guide plate 320 and reflects light incident on a bottom surface of the lower case 400 toward the display panel 200.

The light reflector 340 may be disposed between the light source 310 and the lower case 400. The light reflector 340 may have a first surface 341, a second surface 342 facing the first surface 341 and a third surface 343 connecting the first and the second surfaces 341 and 342, and thus may be a "C-like" shape. The light source 310 may be disposed on the second surface 342. The first and the second surfaces 341 and 342 may extend to overlap with an upper and lower surface of the light guide plate 320. Thus, the first to the third surfaces 341, 342 and 343 may prevent light from leaking between the light source 310 and the light guide plate 320. The light controlling member 350 may diffuse or concentrate the light provided by the light guide plate 320, to make the light uniform.

Figure 3:
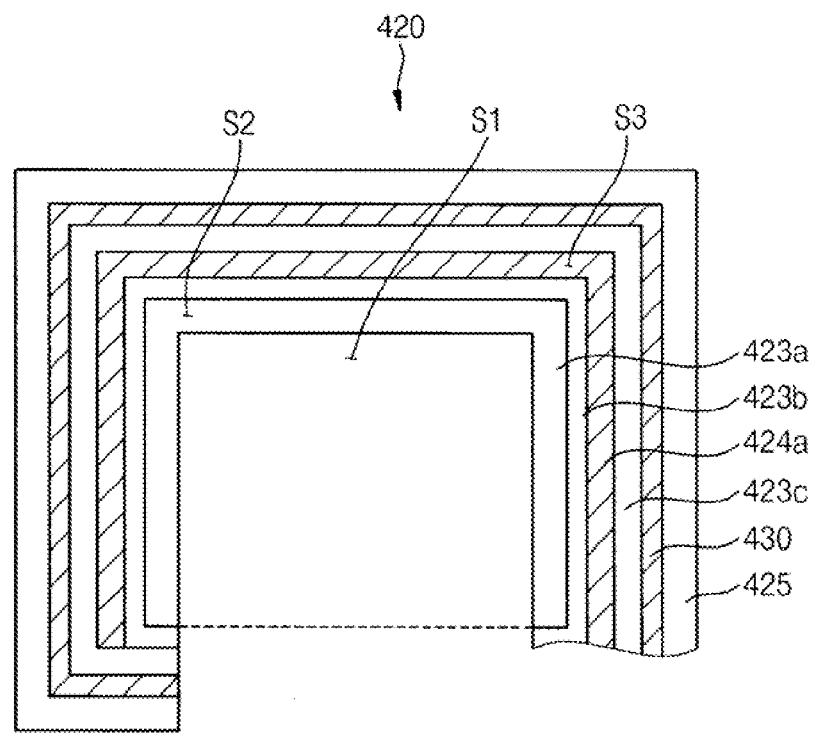
FIG. 3 is a plan view illustrating a lower case of the display apparatus in FIG. 1.

FIG. 3 is a plan view illustrating a lower case of the display apparatus in FIG. 1.

Referring to FIGS. 1 to 3, the lower case 400 includes a receiving part 410 and a sidewall part 420. The receiving part 410 has a planar bottom plate 411 extending in a first direction D1 crossing a second direction D2 (as an example, normal to the second direction D2), and a side portion 412 extending from the bottom plate 411 in the second direction D2 crossing to the first direction D1 (as an example, substantially perpendicular to the first direction D1). The bottom plate 411 may have a quadrilateral shape in a plan view and have a thickness of about 0.8 mm. A quadrilateral shape is exemplary and non-limiting, and a bottom plate may have other shapes in other exemplary embodiments.

For example, when the bottom plate 411 is a quadrilateral, the side portion 412 extends from each of four sides of the bottom plate 411 in the second direction D2. The side portion 412 extending from one of the sides may be partially cut, to form a cover portion 413 covering a hinge part (not shown) connecting to an external apparatus such as the display apparatus, a system, etc.

The receiving part 410 is the outermost part of the display apparatus 1000, receives the additional elements of the display apparatus 1000, and blocks the received elements of the display apparatus 1000 from being seen from outside. For example, the receiving part 410 receives and protects the received elements of the display apparatus 1000, and has an esthetic function as well. The receiving part 410 may include aluminum (Al).

The sidewall part 420 may be separately formed from the receiving part 410 and disposed in the receiving part 410. For example, the sidewall part 420 may have a stepped portion, described as follows. The sidewall part 420 may have a first thickness t1 substantially equal to a depth of the receiving part 410 as defined by the side portion 412, and a second thickness t2 substantially equal to a thickness of the display panel 200 subtracted from the first thickness t1, to simultaneously support the display panel 200 and the protecting member 100. The first thickness t1 may be determined such that a gap between the protecting member 100 and the display panel 200 supported by the sidewall part 420 is about 0.15 mm.

The sidewall part 420 is disposed along the edges of the bottom plate 411 adjacent to the side portion 412 of the receiving part 410. The sidewall part 420 may be adhered to the receiving part 410 by an adhesive. The sidewall part 420 forms a first receiving space S1 for receiving the backlight assembly 300 on the bottom plate 411 of the receiving part 410, and forms a second receiving space S2 for receiving the display panel 200.

In addition, the sidewall part 420 has a third receiving space S3 and a groove 430. A wire 440 is received in the third receiving space S3. The groove 430 surrounds the first, second, and third receiving spaces S1, S2, and S3. The elastic member 500 is fixed to the groove 430. The wire 440 may include wiring electrically connected to the light source unit 310, an external apparatus such as a camera, or an antenna. The shape of the sidewall part 420 may be determined by the placement of the wire 440. For example, if the wire 440 is designed to be disposed along an entire periphery of the sidewall part 420, the third receiving space S3 may be formed along the entire periphery of the sidewall part 420. Alternatively, if the wire 440 is designed to be disposed along a portion of the periphery of the sidewall part 420, the third receiving space S3 may be formed in the peripheral portion of the sidewall part 420.

In addition, the shape of the sidewall part 420 may vary according to a disposition of the light source unit 310. According to an exemplary embodiment of FIG. 2, a first sidewall part 420a not adjacent to the light source unit 310 may include a first lower surface 421a, first, second, third, fourth, fifth, sixth and seventh side surfaces 422a, 422b, 422c, 422d, 422e, 422f and 422g, first, second and third top surfaces 423a, 423b and 423c, and first and second bottom surfaces 424a and 424b, which define the shape of the first sidewall part 420a.

A second sidewall part 420b adjacent to the light source unit 310 may include second and third lower surfaces 421b and 421c, the second to seventh side surfaces 422b, 422c, 422d, 422e, 422f and 422g, eighth and ninth side surfaces 422h and 422i, first to third top surfaces 423a, 423b and 423c, and first and second bottom surfaces 424a and 424b, which define the shape of the second sidewall part 420b.

First, the first sidewall part 420a not adjacent to the light source unit 310 will be explained. The first lower surface 421a, the first to seventh side surfaces 422a, 422b, 422c, 422d, 422e, 422f and 422g, the first to third top surfaces 423a, 423b and 423c and the first and second bottom surfaces 424a and 424b extend along the side portion 412 in a plan view to surround part or all of the backlight assembly 300.

The first lower surface 421a extends in the first direction D1 in a cross sectional view. The seventh side surface 422g extends adjacent to the side portion 412 in the second direction D2 from a first edge of the first lower surface 421a. The first lower surface 421a and the seventh side surface 422g may be adhered to the receiving part 410 by the adhesive.

The first side surface 422a, which is opposite to the seventh side surface 422g, extends in the second direction D2 from the first lower surface 421a to the first top surface 423a and, with the eighth and ninth side surfaces 422h and 422i of the second sidewall part 420b and the bottom plate 411, forms a first receiving space S1 for receiving the backlight assembly. The first side surface 422a prevents the backlight assembly 300 from moving horizontally. The first top surface 423a extends from the first side surface 422a to the second side surface 422b in the first direction D1 in a cross sectional view and is substantially parallel with the first lower surface 421a. The first top surface 423a directly supports one or more edges of the display panel 200.

The second side surface 422b extends from the first top surface 423a in the second direction D2 to second top surface 423b and is substantially parallel with the first side surface 422a. The second side surface 422b forms, over the first receiving space S1, a second receiving space S2 for receiving the display panel 200. The second side surface 422b prevents the display panel 200 from moving horizontally moving. Since the second side surface 422b is closer to the seventh side surface 422g than the first side surface 422a, the second receiving space S2 is wider than the first receiving space S1, when viewed from above.

The second top surface 423b extends from the second side surface 422b in the first direction D1 to the third top side surface 422c and is substantially parallel with the first lower surface 421a. The second top surface 423b directly supports one or more first edge portions of the protecting member 100. Thus, the first side surface 422a, first top surface 423a and second side surface 422b may form a stepped portion.

The third top surface 423c is spaced apart in the first direction D1 from the first top surface 423a by a first space, and is substantially parallel with the first lower surface 421a. The third top surface 423c directly supports one or more second edge portions of the protecting member 100. The second edge portions of the protecting member 100 are closer to an edge of the protecting member 100 than the first edge portions.

The third and fourth side surfaces 422c and 422d and first bottom surface 424a are disposed between the second and third top surfaces 423b and 423c to connect the second and third top surfaces 423b and 423c, and the third and fourth side surfaces 422c and 422d and first bottom surface 424a form the third receiving space S3, in a cross-sectional view. The third side surface 422c extends from the second top surface 423b to the first bottom surface 424a, the first bottom surface 424a extends from the third side surface 422c to the fourth side surface 422d, and the fourth side surface 422d extends from the first bottom surface 424a to the third top surface 423c. Thus, the second and third top surfaces 423b and 423c are farther from the first lower surface 421a than the first bottom surface 424a. A distance from the first bottom surface 424a to the second and third top surfaces 423b and 423c is a first depth of the third receiving space S3.

The fifth and sixth surfaces 422e and 422f and second bottom surface 424b are disposed between the third top surface 423c and the seventh side surface 422g in a cross-sectional view to form the groove 430. The fifth side surface 422e extends from the third top surface 423c to the second bottom surface 424b, the second bottom surface 424b extends from the fifth side surface 422e to the sixth side surface 422f, and the sixth side surface 422f extends from the second bottom surface 424b in the second direction D2. The third top surface 423c farther from the first lower surface 421a than the second bottom surface 424b. A distance from the second bottom surface 424b to the third top surface 423c is a second depth of the groove 430.

In addition, the sidewall part 420 may further include extending surfaces 425 which extend from the sixth side surface 422f in the first direction D1 and then in the opposite second D2 direction to connect to the seventh side surface 422g. The extending surfaces 425 may adhere to the elastic member 500 and the side portion 412 of the receiving part 410. The extending surfaces 425 may increase a contact or adhesion area between the sidewall part 420 and the elastic member 500 and a contact area between the sidewall part 420 and the side portion 412 of the receiving part 410. Alternatively, the extending surfaces 425 may be combined with the elastic member 500 and the side portion 412 of the receiving part 410 by various other methods, such as a screw, a hook, etc.

Next, the second sidewall part 420b adjacent to the light source unit 310 will be explained. The second to seventh side surfaces 422b, 422c, 422d, 422e, 422f and 422g, the first to third top surfaces 423a, 423b and 423c, and the first and second bottom surfaces 424a and 424b of the second sidewall part 420b are substantially the same as the second to seventh side surfaces 422b, 422c, 422d, 422e, 422f and 422g, the first to third top surfaces 423a, 423b and 423c, and the first and second bottom surfaces 424a and 424b of the first sidewall part 420a, so that any repetitive explanation concerning the above elements will be omitted.

The second lower surface 421b extends in the first direction D1 in a cross-sectional view. The second lower surface 421b has a first edge and a second edge opposite to the first edge. The eighth side surface 422h extends from the second edge of the second lower surface 421b in the second direction D2 to the third lower surface 421c. The third lower surface 421c extends from the eighth side surface 422h in the first direction D1 to the ninth side surface 422i, in a cross-sectional view.

The ninth side surface 422i extends from the third lower surface 421c in the second direction D2 to the second lower surface 421b, and forms the first receiving space S1 with the first side surface 422a, the bottom plate 411 and the eighth side surface 422h. The second lower surface 421b, the eighth side surface 422h and the third lower surface 421c may form a stepped portion. The ninth side surface 422i is farther from the seventh side surface 422g of the second sidewall part 420b than the second and eighth side surfaces 422b and 422h. Thus, an indented space is formed adjacent to the eighth side surface 422h in which the light source unit 310 and the light reflector 340 may be disposed. For example, the light source unit 310 and the light reflector 340 may be received in the indented space formed by the eighth side surface 422h and the third lower surface 421c.

The sidewall part 420 may be shaped to stably guide and receive the display panel 200 and the backlight assembly 300 without any additional chassis.

Alternatively, the receiving part 410 and the sidewall part 420 may be integrally formed with each other to be a rigid body.

The elastic member 500 is inserted and fixed into the groove 430. The elastic member 500 may be adhered by the adhesive to the fifth side surface 422e, second bottom surface 423b and sixth side surface 422f of the groove 430. The elastic member 500 has a support portion 510 which extends in the first direction D1 and supports the edge of the protecting member 100, and a guide portion 520 which extends from the support portion 510 in the second direction D2 adjacent to a side surface of the protecting member 100 to guide the protecting member 100. For example, the elastic member 500 may have an L-shape. The elastic member 500 includes an elastic material such as rubber, to protect the edge of the fragile protecting member 100.

According to a present exemplary embodiment, the sidewall part 420 of the lower case 400 of the display apparatus 1000 forms the first receiving space S1 with the bottom plate 411 for receiving the backlight assembly 300, forms the second receiving space S2 for receiving the display panel 200 and for supporting the edge of the display panel 200 and the edge of the protecting member 100. Thus, a chassis and adhesive tape may be eliminated, reducing the manufacturing cost and a weight and thickness of a display apparatus such as that for a laptop computer.

In addition, the elastic member 500 of the display apparatus 1000 supports and protects the edges of the protecting member 100.

Figure 4:
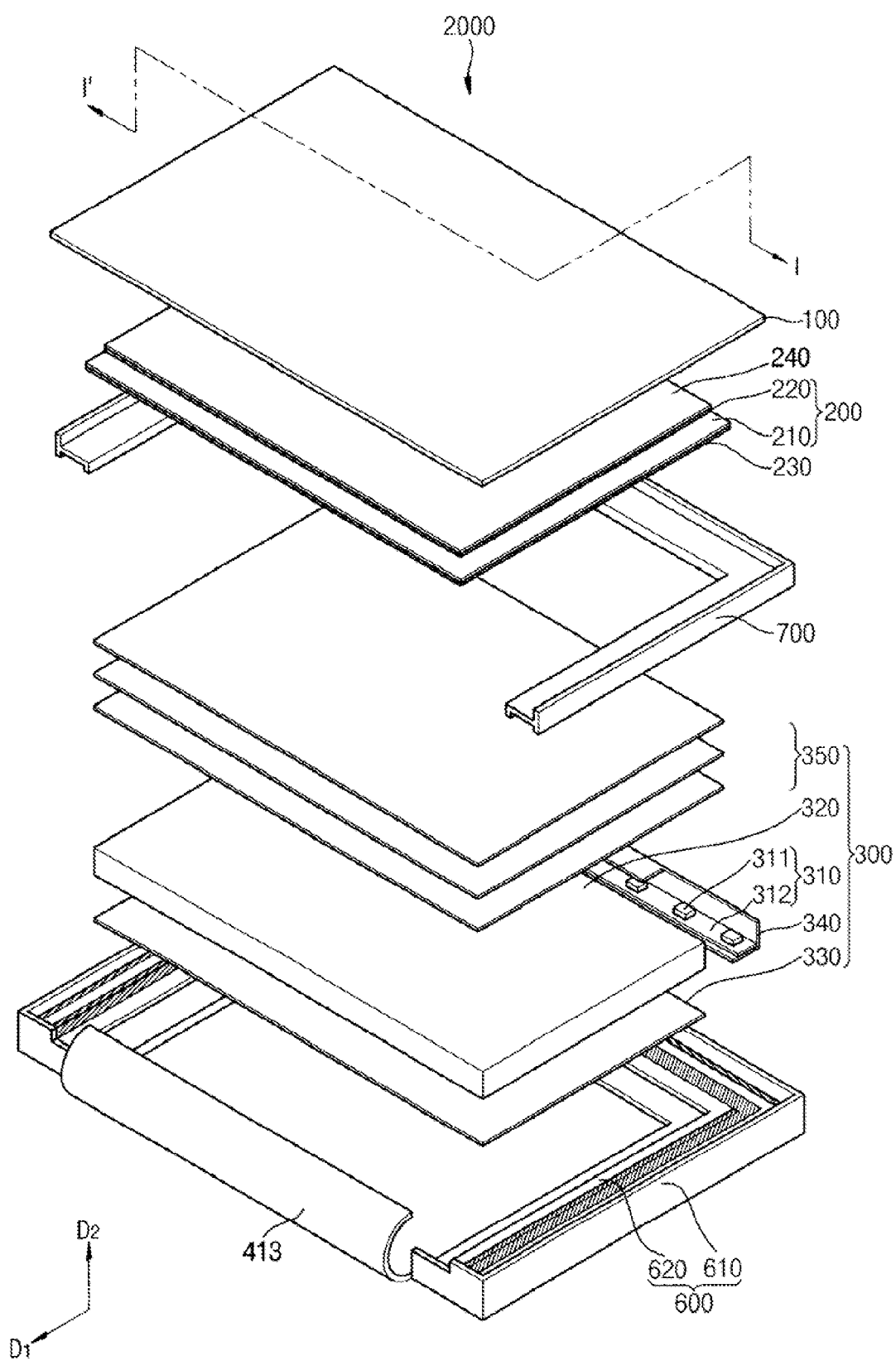
FIG. 4 is an exploded perspective view illustrating a display apparatus according to another exemplary embodiment of the present disclosure.
Figure 5:
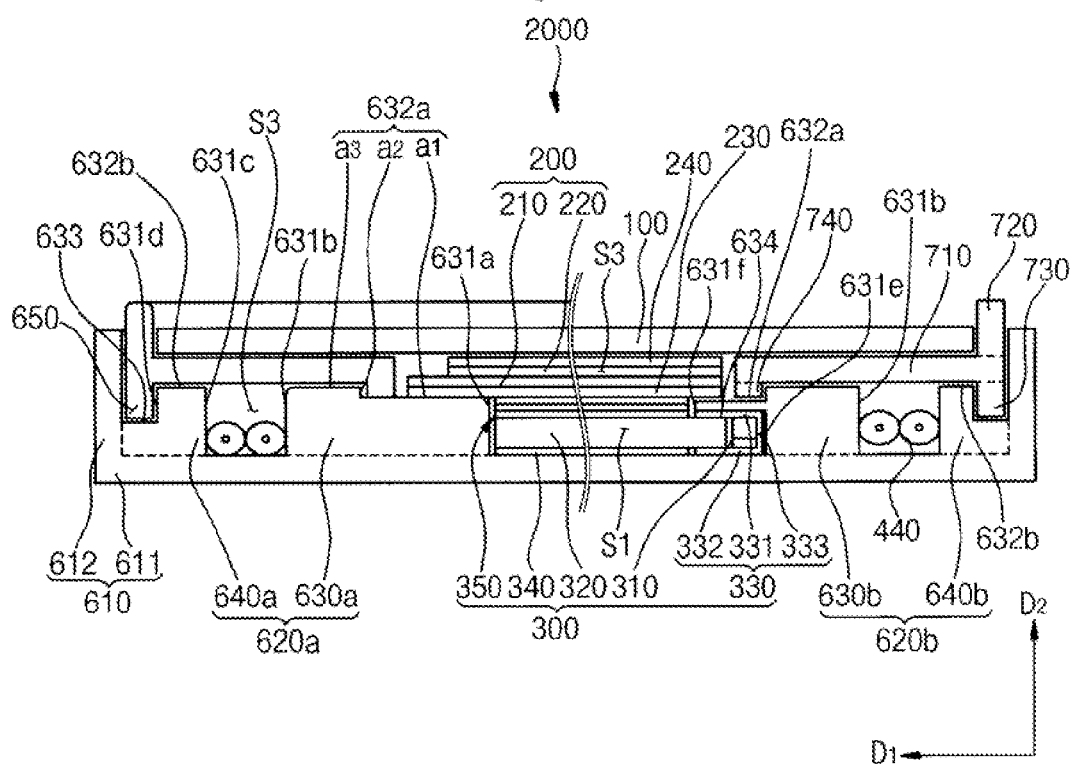
FIG. 5 is a cross-sectional view taken along a line II-II' of FIG. 4.
Figure 6:
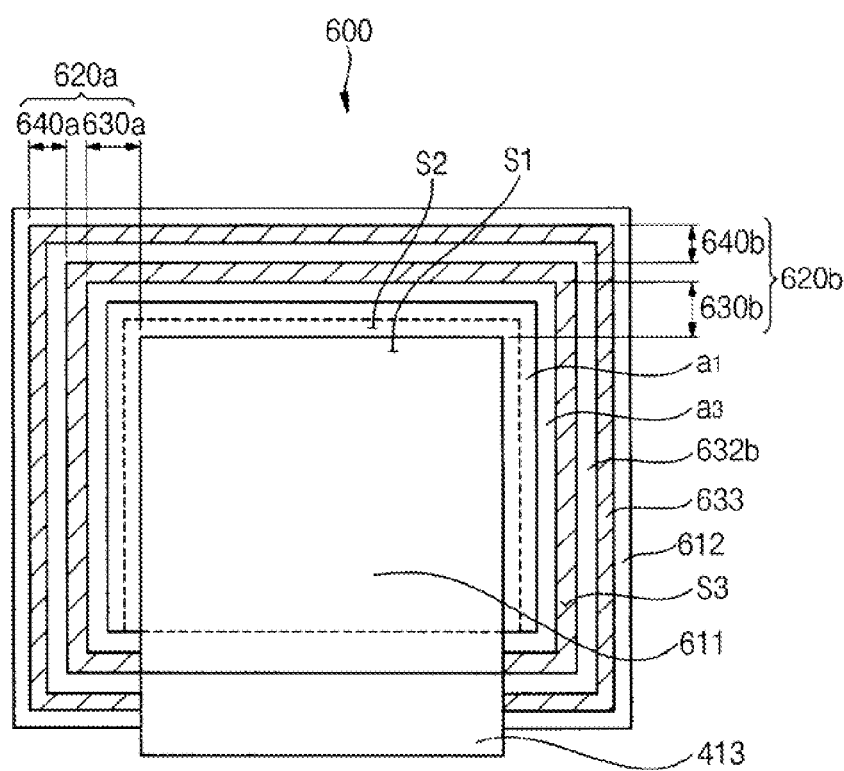
FIG. 6 is a plan view illustrating a lower case of the display apparatus in FIG. 4.

FIG. 4 is an exploded perspective view illustrating a display apparatus according to another exemplary embodiment of the present disclosure. FIG. 5 is a cross-sectional view taken along a line II-II' of FIG. 4. FIG. 6 is a plan view illustrating a lower case of the display apparatus in FIG. 4.

A display apparatus according to a present exemplary embodiment of FIGS. 4, 5 and 6 is substantially the same as a display apparatus according to a previous exemplary embodiment of FIG. 1 except for a shape of a lower case. Thus, the same reference numerals will be used to refer to the same or like parts as those described in a previous exemplary embodiment of FIG. 1 and any repetitive explanation concerning the above elements will be omitted.

Referring to FIG. 4 to FIG. 6, a display apparatus 2000 includes a protecting member 100, a display panel 200, a backlight assembly 300, a lower case 600 and an elastic member 700.

The lower case 600 includes a receiving part 610 and a sidewall part 620. The receiving part 610 has a planar bottom plate 611 that extends in a first direction D1 crossing a second direction D2 (as an example, normal to a second direction D2), and a side portion 612 extending from the bottom plate 611 in the second direction D2 crossing the first direction D1 (as an example, perpendicular to the first direction D1). The lower case 600 may include magnesium (Mg). The receiving part 610 and the sidewall part 620 may be integrally formed with each other to be a rigid body. The sidewall part 620 may have a thickness less than a depth of the receiving part 610 to support the display panel 200. The sidewall part 620 is disposed along a peripheral surface of the bottom plate 611 adjacent to the side portion 612. The sidewall part 620 forms, with the bottom plate 611, a first receiving space S1 for receiving the backlight assembly 300. The sidewall part 620 includes a third receiving space S3 for receiving a wire 440 and a groove 650 to which the elastic member 700 is fixed.

A shape of the sidewall part 620 may vary according to a disposition of the light source unit 310. According to an exemplary embodiment of FIG. 5, a first sidewall part 620a not adjacent to the light source unit 310 may include a first sidewall portion 630a and a second sidewall portion 640a spaced apart from the first sidewall portion 630a in the first direction D1. The first sidewall portion 630a includes a first side surface 631a, a second side surface 631b and a first top surface 632a, which define a shape of the first side wall portion 630a. The second sidewall portion 640a includes a third side surface 631c, a fourth side surface 631d, a second top surface 632b and a bottom surface 633, which define a shape of the second sidewall portion 640a.

A second sidewall part 620b adjacent to the light source unit 310 may include a third side wall portion 630b and a fourth side wall portion 640b spaced apart from the third side wall portion 630b in the opposite D1 direction. The third side wall portion 630b includes a lower surface 634, the second side surface 631b, a fifth side surface 631e, a sixth side surface 631f and the first top surface 632a, which define a shape of the third side wall portion 630b. The fourth side wall portion 640b has substantially the same shape as the second sidewall portion 640a.

The first and third side wall portions 630a and 630b are disposed along the periphery of the bottom plate 611 closer to a center of the bottom plate 611 than the second and fourth side wall portions 640a and 640b, so that the first and third side wall portions 630a and 630b, along with the bottom plate, form the first receiving space S1. The first sidewall portion 630a prevents the backlight assembly 300 from moving horizontally.

First, the first sidewall part 620a not adjacent to the light source unit 310 will be explained. The first and second side surfaces 631a and 631b and the first top surface 632a of the first sidewall 630a, and the third and fourth side surfaces 631c and 631d, the second top surface 632b and the bottom surface 633 of the second sidewall 640a, extend along the side portion 612 of the receiving part 610 in a plan view to surround part or all of the backlight assembly 300.

The first side surface 631a of the first sidewall portion 630a extends from the bottom plate 611 of the receiving part 610 in the second direction D2 to the first top surface 632a, and forms, with the bottom plate 611 and the fifth and sixth side surfaces 631e and 631f of the third side wall portion 630b, a first receiving space S1 for receiving the backlight assembly 300. The first side surface 631a prevents the backlight assembly 300 from moving horizontally.

The first top surface 632a of the first sidewall portion 630a extends from the first side surface 631a in the first direction D1 to the second side surface 631b, and is substantially parallel with the bottom plate 611 in a cross-sectional view. An edge surface of the display panel 200 may be disposed on a first portion of the first top surface 632a to be directly supported by the first top surface 632a. The elastic member 700 may be disposed on a second portion of the first top surface 632a to be adhered to the first top surface 632a.

Alternatively, the first top surface 632a may have a first portion a1 connected to the first side surface 631a, a second portion a2 extending from the first portion a1 in the second direction D2 to a third portion a3, where the third portion a3 extends from the second portion a2 in the first direction D1 to the second side surface 631b. The first to third portions a1, a2 and a3 form a stepped portion, which increases a contact, i.e., adhesion area between the first top surface 632a and the elastic member 700.

The edge surface of the display panel 200 and a protrusion portion 740 of the elastic member 700 may be disposed on the first portion a1, and a support portion 710 of the elastic member 700 may be disposed on the third portion a3. The contact area between the first top surface 632a and the elastic member 700 may be increased by the area of the second portion a2.

The second side surface 631b of the first sidewall portion 630a extends from the first top surface 632a in the opposite D2 direction to the bottom plate 611 in a cross-sectional view. The first sidewall portion 630a protrudes from the bottom plate 611 in the second direction D2.

The third side surface 631c of the second sidewall portion 640a extends from the bottom plate 611 in the second direction D2 to the second top surface 632b, and faces the second side surface 631b of the first sidewall portion 630a. The third side surface 631c, along with the second side surface 631b and the portion of bottom plate 611 exposed by the first and second sidewall portions 630a and 640a, forms the third receiving space S3.

The second top surface 632b of the second sidewall portion 640a extends from the third side surface 631c in the first direction D1 to the fourth side surface 631d, and the fourth side surface 631d of the second sidewall portion 640a extends from the second top surface 632b in opposite D2 direction to the bottom surface 633.

The bottom surface 633 of the second sidewall portion 640a extends from the fourth side surface 631d in the first direction D1 to the side portion 612 of the receiving part 610. The fourth side surface 631d, the bottom surface 633 and the side portion 612 of the receiving part 610 form a groove 650 to which the elastic member 700 is fixed. The second sidewall portion 640a protrudes from the receiving part 610 and the bottom plate 611.

Next, the second sidewall part 620b adjacent to the light source unit 310 will be explained. The second side surface 631b and first top surface 632a of the third side wall portion 630b are substantially the same as the second side surface 631b and first top surface 632a of the first sidewall portion 630a, and the fourth side wall portion 640b is substantially the same as the second sidewall portion 640a, so that any repetitive explanation concerning the above elements will be omitted.

The fifth side surface 631e of the third side wall portion 630b extends from the bottom plate 611 of the receiving part 610 to lower surface 634 in a cross-sectional view.

The lower surface 634 of the third side wall portion 630b extends from the fifth side surface 631e in the first direction D1 to sixth side surface 631f. The sixth side surface 631f extends from the lower surface 634 to first top surface 632a in a cross-sectional view, and forms the first receiving space S1 with the sixth side surface 631f of the third side wall portion 630b, the bottom plate 611, and the first side surface 631a of the first sidewall portion 630a. Thus, the third side wall portion 630b is indented to form a space to receive a light source unit 310 and a light reflector 340 of the backlight assembly 300.

For example, the light source unit 310 and the light reflector 340 may be received in the indented space formed by the fifth side surface 631e, the lower surface 634 and the bottom plate 611. The sidewall part 620 is shaped to stably guide and receive the backlight assembly 300 without any additional chassis.

Alternatively, the sidewall part 620 may be separately formed from the receiving part 610. When the sidewall part 620 is separately formed, as illustrated by dotted lines in FIG. 5, the first and second sidewall parts 620a and 620b may be combined and fixed to the receiving part 610.

The elastic member 700 is disposed between the protecting member 100 and the lower case 600. The elastic member 700 includes a support portion 710 and a guide portion 720. The support portion 710 extends in the first direction D1, is disposed on the first and second top surfaces 632a and 632b, and supports one or more edges of the protecting member 100. A thickness of the support portion 710 may be determined so that a gap between the protecting member 100 and the display panel 200 is about 0.15 mm. The support portion 710 is disposed on the first and second top surfaces 632a and 632b and covers the third receiving space S3 between the first and second top surfaces 632a and 632b, to prevent the wires 440 in the receiving space S3 from separating from the receiving space S3. In addition, the support portion 710 forms the second receiving space S2 over the first receiving space S1. The support portion 710 prevents the display panel 200 from moving horizontally.

The guide portion 720 extends upward from a top surface of the support portion 710 in the second direction D2, adjacent to a side surface of the protecting member 100, and guides the protecting member 100. For example, the elastic member 700 may have an L-shape.

In addition, the elastic member 700 may further include first and second protrusions 730 and 740 at opposite ends of the support portion 710. The first protrusion 730 extends in the opposite D2 direction from a lower surface of a first end of the support portion 710 opposite to the guide portion 720 extending from the top surface of the support portion 710 and is fixed to the groove 650 of the sidewall part 620. The second protrusion 740 extends from the lower surface of a second end of the support portion 710 and makes contact with the first top surface 632a. A contact area of the elastic member 700 with the sidewall part 620 may be increased by the first and second protrusions 730 and 740.

The elastic member 700 may be adhered to the sidewall part 620 and the protecting member 100 by the adhesive. Alternatively, the elastic member 700 may be fixed to the sidewall part 620 and the protecting member 100 by a mechanical linkage, such as a screw, a hook, etc. The elastic member 700 includes an elastic material such as a rubber which protects the edge of the fragile protecting member 100.

According to a present exemplary embodiment of FIG. 4, the sidewall part 620 of the lower case 600 of the display apparatus 2000 forms the first receiving space S1 for simultaneously receiving the backlight assembly 300 and supporting the edge of the display panel 200, and the elastic member 700 of the display apparatus 2000 forms the second receiving space S2 for simultaneously receiving the display panel 200 and supporting the edge of the protecting member 100. A chassis having adhesive tape is no longer required, which reduces a manufacturing cost and a weight and thickness of a display apparatus such as a laptop computer.

In addition, the elastic member 700 of the display apparatus 2000 supports and protects the edge of the protecting member 100.

According to the exemplary embodiments, a receiving space for receiving a backlight assembly and a display panel of the display apparatus is formed by at least one of a lower case and an elastic member instead of a chassis, eliminating the need for a chassis, and reducing the manufacturing cost and the weight and thickness of the display apparatus.

In addition, a display apparatus includes an elastic member disposed between an edge of a protecting member and a lower case, preventing the edge of the protecting member from being damaged.

In addition, a display apparatus includes an elastic member guiding a side surface of the display panel, preventing the side surface of the display panel from being damaged.

The foregoing is illustrative of the embodiments of the present disclosure and is not to be construed as limiting thereof. Although a few exemplary embodiments of the present disclosure have been described, those skilled in the art will readily appreciate that many modifications are possible in the exemplary embodiments without materially departing from the novel teachings and advantages of the embodiments of the present disclosure. Therefore, it is to be understood that the foregoing is illustrative of the embodiments of the present disclosure and is not to be construed as limited to the specific exemplary embodiments disclosed, and that modifications to the disclosed exemplary embodiments, as well as other embodiments, are intended to be included within the scope of the appended claims. Embodiments of the present disclosure are defined by the following claims, with equivalents of the claims to be included therein.

What is claimed is:

1. A display apparatus comprising:
    a display panel for displaying an image;
    a backlight assembly disposed under the display panel that includes a light source unit along a side of the backlight assembly; and
    a lower case having a first receiving space for receiving the backlight assembly a third receiving space surrounding the first receiving space on at least three sides and facing a same direction as the first receiving space for receiving a wire, and a groove that surrounds the first and third receiving spaces on at least three sides and faces the same direction as the first and third receiving spaces.

2. The display apparatus of claim 1, wherein the lower case comprises:
    a receiving part having
        a planar bottom plate extending in a first direction and
        a side portion substantially perpendicular to and extending from the bottom plate in a second direction normal to the bottom plate; and
    a sidewall part disposed along an edge of the bottom plate that forms the first receiving space with the bottom plate, wherein the sidewall part comprises
        a first sidewall not adjacent to the light source unit and
        a second sidewall adjacent to the light source unit.

3. The display apparatus of claim 2, wherein the first sidewall comprises:
    a first side surface extending from the bottom plate in the second direction;
    a first top surface extending from the first side surface in the first direction that supports the display panel;
    a second side surface extending from the first top surface in the second direction that forms a second receiving space for receiving the display panel and for preventing the display panel from moving horizontally; and
    a second top surface extending from the second side surface in the first direction.

4. The display apparatus of claim 3, wherein the first sidewall further comprises:
    a third side surface extending from the second top surface in an opposite second direction;
    a first bottom surface extending from the third side surface in the first direction; and
    a fourth side surface extending from the first bottom surface in the second direction and facing the third side surface,
    wherein the third side surface, the first bottom surface and the fourth side surface form the third receiving space.

5. The display apparatus of claim 4, wherein the first sidewall further comprises:
    a third top surface extending from the fourth side surface in the first direction;
    a fifth side surface extending from the third top surface in the opposite second direction;
    a second bottom surface extending from the fifth side surface in the first direction; and
    a sixth side surface extending from the second bottom surface in the second direction.

6. The display apparatus of claim 5, further comprising:
    a protecting member disposed on the sidewall part and the display panel; and
    an elastic member disposed between the sidewall part and the protecting member,
    wherein the fifth side surface, the second bottom surface, and the sixth side surface form the groove for receiving the elastic member that supports the protecting member and prevents the protecting member from moving horizontally.

7. The display apparatus of claim 5, wherein the second sidewall comprises:
    an eighth side surface extending from the bottom plate in the second direction;
    a third lower surface extending from the eighth side surface in the first direction; and a ninth side surface extending from the third lower surface in the second direction,
    wherein the bottom plate, the eighth side surface, and the third lower surface form an indented space for receiving the light source unit,
    and the first side surface, the eight side surface and the ninth side surface form the first receiving space for receiving the backlight unit.

8. The display apparatus of claim 2,
    wherein the first sidewall comprises a first sidewall portion and a second sidewall portion spaced apart from the first sidewall portion in the first direction,
    and the second sidewall comprises third sidewall portion and a fourth sidewall portion spaced apart from the third sidewall portion in the opposite first direction,
    wherein the first and third sidewall portions are disposed along the periphery of the bottom plate closer to a center of the bottom plate than the second and fourth sidewall portions wherein the first and third sidewall portions form the first receiving space, and
    the space between the first and second sidewall portions and between the third and fourth sidewall portions forms the third receiving space.

9. The display apparatus of claim 8,
    wherein the first sidewall portion comprises
        a first side surface extending from the bottom plate in the second direction,
        a first top surface extending from the first side surface in the first direction, and
        a second side surface extending from the first top surface in the opposite second direction; and
    the second sidewall portion comprises
        a third side surface extending from the bottom plate in the second direction,
        a second top surface extending from the third side surface in the first direction, a fourth side surface extending from the second top surface in the opposite second direction, and
a bottom surface extending from the fourth side surface in the first direction,
wherein the first top surface comprises
a first portion connected to the first side surface,
a second portion extending from the first portion in the second direction, and
a third portion extending from the second portion in the first direction and connected to the second side surface,
wherein the first to third portions form a stepped portion,
wherein the fourth side surface, the bottom surface, and the side portion of the receiving part form the groove.

10. The display apparatus of claim 9, further comprising an elastic member disposed on the first to third portions of the first top surface, the second top surface and the bottom surface,
wherein the elastic member covers the third receiving area, partially overlaps with the first portion of the first top surface and forms a second receiving area for receiving the display panel and preventing the display panel from moving horizontally.

11. The display apparatus of claim 10, wherein the elastic member comprises:
a support portion extending in the first direction that is disposed on the first and second top surfaces;
a guide portion extending from a top surface of the support portion in the second direction and adjacent to the protecting member; and
first and second protrusions extending in the opposite second direction from a bottom surface of the support portion at opposite ends of the support portion, w
herein the first protrusion is disposed on the bottom surface and the second protrusion is disposed on the first portion of the first top surface.

12. The display apparatus of claim 2, wherein the receiving part is separately formed with the sidewall part, and assembled with the sidewall part.

13. The display apparatus of claim 2, wherein the receiving part and the sidewall part are integrally formed with each other to be a rigid body.

14. A lower case for a display apparatus, comprising:
a receiving part having
a planar bottom plate extending in a first direction and
a side portion substantially perpendicular to and extending from the bottom plate in a second direction normal to the bottom plate; and
a sidewall part disposed along an edge of the bottom plate that forms a first receiving space with the bottom plate for receiving a backlight assembly having a light source assembly,
wherein the sidewall part comprises
a first sidewall not adjacent to the light source unit,
a second sidewall adjacent to the light source unit,
a third receiving space surrounding the first receiving space on at least three sides and facing a same direction as the first receiving space for receiving a wire, and
a groove that surrounds the first and third receiving spaces on at least three sides and faces the same direction as the first and third receiving spaces.

15. The lower case of claim 14, wherein the first sidewall comprises
a first sidewall portion for preventing the backlight assembly from horizontally moving and for supporting the display panel; and
a second sidewall portion spaced apart from the first sidewall in the first direction that forms the second receiving space with the first sidewall and the bottom plate of the receiving part.

16. The lower case of claim 15, wherein the first sidewall portion comprises:
a first side surface extending in the second direction to form the first receiving space with the bottom plate, and preventing the backlight assembly from horizontally moving;
a first top surface extending from the first side surface in the first direction and supporting the display panel; and
a second side surface connected to the first top surface and substantially parallel with the first side surface.

17. The lower case of claim 16, wherein the first top surface comprises
a first portion connected to the first side surface,
a second portion extending from the first portion in the second direction, and
a third portion extending from the second portion in the first direction and connected to the second side surface,
wherein the first to third portions form a stepped portion.

18. The lower case of claim 17, further comprising an elastic member disposed on the first to third portions of the first top surface, the second top surface and the bottom surface,
wherein the elastic member is fixed in the groove and covers the third receiving area, partially overlaps with the first portion of the first top surface and forms a second receiving area for receiving a display panel and preventing the display panel from moving horizontally.

19. The lower case of claim 16, wherein the second sidewall portion comprises:
a third side surface facing the second side surface of the first sidewall; and
a second top surface extending from the third side surface in the first direction,
wherein the second and third side surfaces form the third receiving space with the bottom plate of the receiving part.

* * * * *